Jan. 27, 1953  D. GLAZER  2,626,830
STICK-HOLDING DEVICE
Filed March 15, 1949  2 SHEETS—SHEET 1
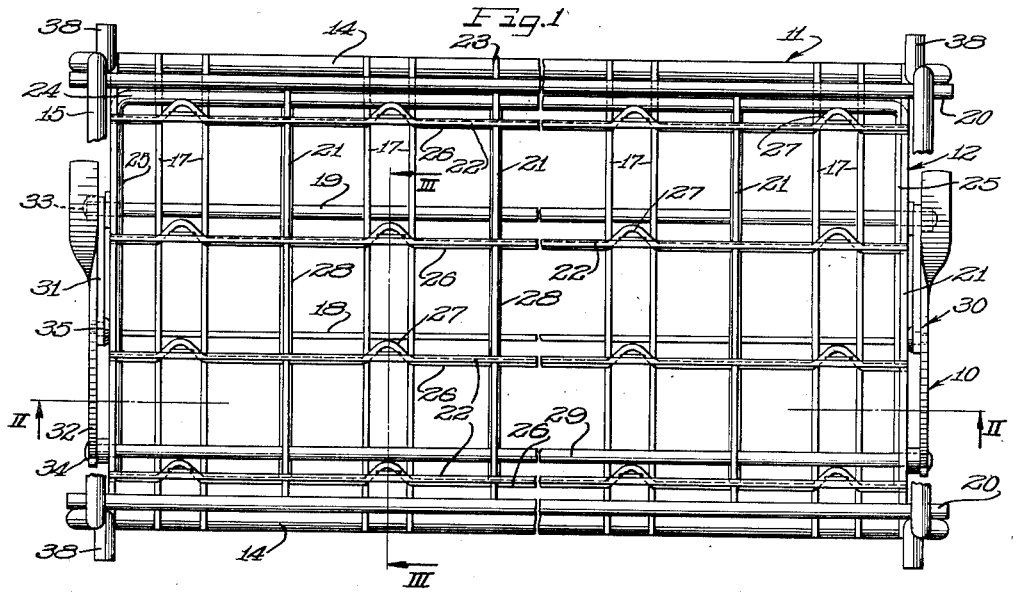
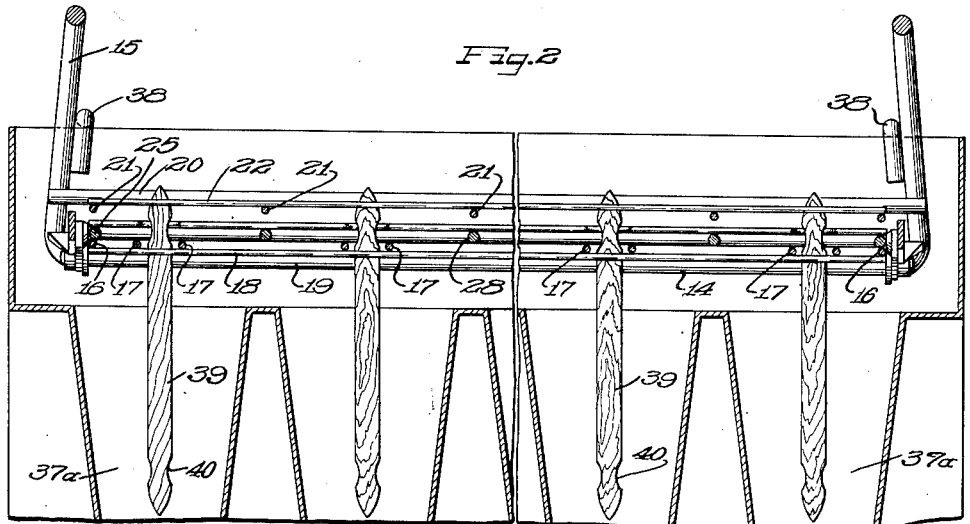
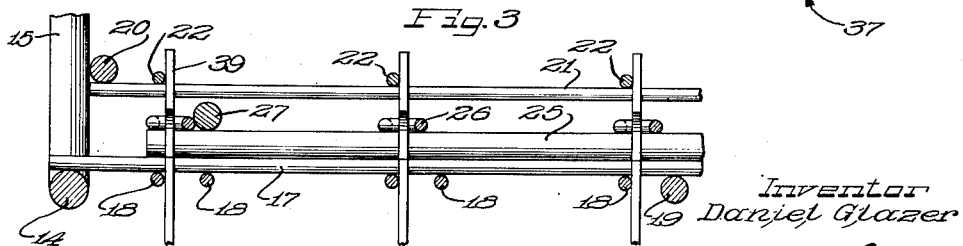
Inventor
Daniel Glazer
By The Firm of Charles W. Hills
Attys Jan. 27, 1953 — D. GLAZER — 2,626,830
STICK-HOLDING DEVICE
Filed March 15, 1949 — 2 SHEETS—SHEET 2

Inventor
Daniel Glazer
By The Firm of Charles W. Hills
Attys

Patented Jan. 27, 1953

2,626,830

UNITED STATES PATENT OFFICE 2,626,830

STICK-HOLDING DEVICE

Daniel Glazer, Chicago, Ill., assignor to Frigie Corporation of America, Chicago, Ill., a corporation of Illinois Application March 15, 1949, Serial No. 81,582

2 Claims. (Cl. 294—87.24)

This invention relates to a stick-holding device and more particularly to a device for holding a plurality of confection sticks in aligned, parallel relation during the congealing of a confection upon a portion of the sticks.

In the art of making frozen or congealed confections, the proper positioning and retention of the sticks upon which the confection is congealed has long presented a problem. The sticks must be held in more or less exact alignment so that they may be positioned properly in the congealing bath or tank within which the confection is congealed upon the sticks so held to form the individual confection. Various forms of relatively complicated, expensive apparatus for so positioning and aligning the sticks have been proposed. However, there is a long-felt need in the art for a simple, inexpensive, readily employed device for positioning a portion of such sticks within a congealing bath.

The present invention provides an improved form of a stick-holding device for use in the congealed confection art. The present invention includes a support frame and a slide rack movable relative to the frame and coacting therewith to secure confection sticks therebetween. The support frame is provided with a pair of spaced surfaces for contacting one side of a stick positioned therein and the slide rack may be moved into position to contact the opposite side of the sticks to urge the sticks toward the support frame and thus securely position the sticks within the device. Toggle lever means are provided for effecting movement of the slide rack relative to the frame and for securely clamping the frame and the rack in relatively adjusted position with the sticks therebetween.

The device of the present invention is light in weight and portable for use as desired. The device is preferably of such size as to be handled by one person and the toggle means may be manipulated by the person employing the device. The relatively simple construction and operation of the device of the present invention results in the provision of an inexpensive, easily handled, efficient device which answers the needs of the art.

It is, therefore, an important object of the present invention to provide an improved form of a stick-holder for use in making congealed confections.

Another important object of the present invention is to provide an improved, inexpensive, readily manipulated stick-holding device for maintaining a plurality of confection sticks in aligned parallel relation for positioning within a confection congealing bath.

It is a further important object of the present invention to provide an improved stick holding device including a supporting frame, a slide rack movable relative to the frame and lever means for securing the movable parts of the device in adjusted relation with a plurality of confection sticks secured therebetween.

A still further important object of the present invention is to provide a stick-holding device for retaining a plurality of confection sticks in aligned parallel relation for immersion within a confection bath, the device including toggle lever means for causing adjusted movement of component parts of the device either to securely clamp the confection sticks therein or to simultaneously release the plurality of sticks.

Other and further important objects of this invention will be apparent from the disclosures in the specification and the accompanying drawings.

On the drawings:

Figure 1 is a plan view, with parts broken away, of the device of the present invention;

Figure 2 is an enlarged sectional view taken along the plane II—II of Figure 1, illustrating the positioning of the device;

Figure 3 is a greatly enlarged, fragmentary sectional view taken along the plane III—III of Figure 1;

As shown on the drawings:

Figure 4:
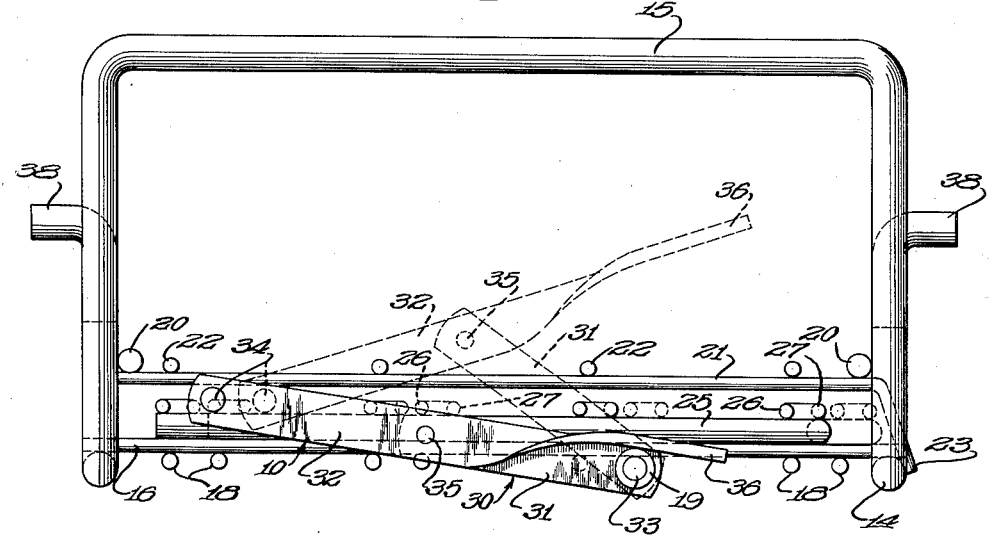
Figure 4 is an enlarged end view of the device of Figure 1.

In Figure 1, reference numeral 10 refers generally to a stick-holding device of the present invention including a supporting frame 11, a fixed upper tray 12, and a movable slide rack.

The supporting frame 11 includes a marginal rod 14 defining the outer side dimensions of the generally rectangular frame 11 and having integrally formed upwardly extending looped end handle portions 15, as best shown in Figure 4. As shown in Figure 2 of the drawings, a pair of additional transversely extending marginal rods 16 are secured to the parallel side rods 14 to underlie handles 15, thus cooperating with rods 14 to define the rectangular outline of the frame. Additional transversely extending members 17 are secured to the side frame members 14 and extend therebetween parallel to the members 16 for a purpose to be hereinafter more fully described. It will be noted from the drawing that the members 16 and 17 are of substantially less diameter than the side frame member 14.

In addition to the transversely extending members 17, the frame is provided with longitudinally extending rods 18 secured to the transverse members 17 and extending parallel to the side rods 14. The members 14, 16, 17 and 18 thus secured together by suitable means, as by brazing, soldering or spot-welding, cooperate to define the fixed supporting frame 11 of the device 10.

In addition to the parallel members 18, an additional rod 19, having a diameter larger than the members 18, is provided to extend parallel to members 14 for a reason to be hereinafter more fully described.

The fixed upper tray 12 is of substantially the same size as the frame 11, the tray being secured to the frame 11 by suitable means to extend in parallel spaced relation thereto. The tray 12 includes a pair of spaced, parallel longitudinal rods 20, secured to the upstanding handles 15 of the supporting frame 11 as by welding, and extending generally parallel to and spaced above rods 14; a plurality of transversely extending rods 21 secured to the members 20; and a plurality of additional longitudinal members 22 secured to the transverse members 21 and extending parallel to the rods 20.

Thus, it may be seen that the supporting frame 11 and the upper tray 12 comprise a unitary rigid supporting structure. It will be noted that one or more of the transverse members 21 of the upper tray 12 is bent downwardly to contact member 14 intermediate its length, the members 21 being secured to the member 14 as at 23 (Figure 4) to reinforce the upper tray structure.

It will be further noted that the members 22 of the tray 12 extend parallel to the members 18 of the supporting frame 11 and that these members are vertically spaced in vertical alignment for a purpose to be hereinafter more fully described.

The slide rack comprises a U-shaped outer marginal frame including a base arm formed by rod 24, and parallel side arms 25 formed integrally with base arm 24. A plurality of parallel, longitudinal clamping members 26 extend parallel to the base arm 24 and are secured to the side arms 25 by suitable means, as by spot-welding. The clamping members 26 are each provided with a plurality of spaced, transversely offset, generally U-shaped bends 27. The bends 27 of each of the clamping rods 26 are transversely aligned across the width of the slide rack, and the clamping members 26 are spaced apart substantially the distance between the longitudinal members 22 of the upper tray 12. A plurality of transversely extending reinforcing members 28 are provided for the slide rack to reinforce the clamping members 26, the transverse members 28 directly underlying the transverse members 21 of the fixed upper tray 12. The slide rack also carries a longitudinally extending rod 29 parallel to the clamping rods 26 and also parallel to the longitudinal rod 19 of the frame 11.

Movement of the side rack between the supporting frame 11 and the upper tray 12 is accomplished by a toggle lever assembly 30. The toggle lever assembly 30, one of which is positioned at each end of the frame 11, includes a pair of lever arms 31 and 32, the arm 31 being pivoted to rod 19 about a pin 33 axially received by the rod 19 and one end of the arm 32 being pivoted about a pin 34 axially received by the adjacent end of the rod 29. The arms 31 and 32 are pivoted about a pin 35 securing the free ends of arm 31 and arm 32 at a point approximately midway of the arm 32. The end of arm 32 opposite that end which is pivoted for attachment to rod 29 is provided with a flat terminal handle portion 36 extending beyond arm 31.

As seen in Figure 4, the flat handle portion 36 contacts that end of rod 19 extending beyond arm 31 to limit relative movement of the arms 31 and 32 about pin 35. When the movement of arms is thus limited, it may be seen that the pivot points 33, 34 and 35 lie in a single plane, so that any endwise stress placed upon either of the arms 30, 31 and 32 serves only to tighten the engagement maintaining the arms in their aligned position. However, upon lifting arm 32 by handle portion 36 to the dotted position of Figure 4, the distance between pins 33 and 34 is shortened and the slide rack is moved relative to the frame 11 and to the upper tray 12. Thus, the slide rack may be moved into a plurality of selected adjusted positions relative to the frame upon selective movement of the toggle lever assembly 30 positioned at each extremity of the frame 11.

The operation of the device of the present invention will be readily understood from the foregoing description. As shown in Figure 2, the device is adapted to be employed in connection with a vat 37 having a plurality of individual confection molds 37a. Each of the end handle portions 15 is provided a support 38 secured thereto and extending transversely outwardly beyond the confines of the device. The device is dimensioned to fit within the vat 37 with the supports 38 overlying an upper wall of the vat to position the device therein. To secure a plurality of confection sticks 39 within the device to extend into the molds 37a, it is only necessary that the handle lever assembly 30 be actuated by movement of the handle portion 36 to effect movement of the slide rack relative to the frame 11, moving the clamping portions 27 of rods 26 away from the associated longitudinal bracing rods 18 and 22, respectively, of the frame 11 and tray 12.

Figure 5:
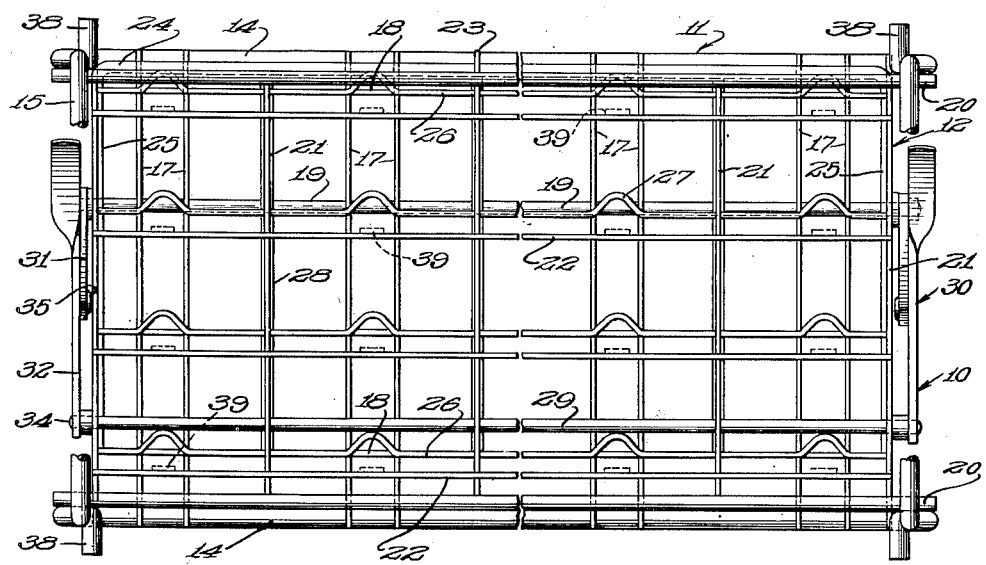
Figure 5 is a view similar to Figure 1 illustrating the movement of the component parts of the device to an adjusted position.

This position is illustrated in Figure 5 of the drawings in which it may be seen that a stick 39 may then be inserted between the associated portions of the frame and the slide rack. Upon movement of the toggle lever assembly 30 to locked position, as shown in full lines in Figure 4, the slide rack is moved within the frame into position to secure the sticks 39 between the spaced, vertically aligned longitudinal members 18 and 22 and the respective curved portions 27.

It is to be noted that the stick-contacting portions of the frame, namely, rods 22 and 18, are in lined contact with spaced portions of one surface of the stick, and that the opposite surface of the stick is engaged intermediate its points of contact with the frame by the curved clamping portions 27 of the slide rack. Thus, opposite side surfaces of the sticks are engaged at spaced points to secure the sticks within the device.

It is not necessary that the sticks be positioned accurately in exact position to lie flush with the members 22 and 18 prior to the engagement of the sticks by the curved portions 27, inasmuch as the curved portions 27 will force the sticks into the desired position flush with the members 18 and 22 upon movement of the toggle lever assembly. Further, although the sticks 39 are shown as being notched adjacent each end, as at 40, it is not necessary that the sticks be so notched. I have found that suitable results may be obtained in the employment of the device of the present invention in employing non-notched sticks.

It will, of course, be evident to those skilled in the art that the device of the present invention is susceptible to considerable modification without modifying the substance of the invention. For example, the device may be formed by the assembly of stamped sheet metal parts. However, the operation of the device in this instance would be substantially the same as the embodiment herein described. The advantages residing in the employment of rod stock to form the device will be evident in the ease of fabrication and of securing the component parts of the device in their assembled relation by welding, brazing, or soldering operations.

It will, of course, be understood that various details of construction may be varied through a wide range without departing from the principles of this invention, and it is, therefore, not the purpose to limit the patent granted hereon otherwise than necessitated by the scope of the appended claims.

I claim as my invention:

1. A stick holding device comprising an elongated rigid frame having spaced longitudinally extending vertically aligned rods and a longitudinally extending slide rack movable transversely relative to said rigid frame and having a longitudinally extending rod lying between the vertically aligned rods of said frame, said longitudinally extending rod having spaced transversely offset V-shaped bends therein to define converging clamping portions, said vertically spaced rods of said frame being adapted for elongated line engagement with one side surface of a stick placed thereagainst, and the clamping portions of the rack rod being adapted for engagement with an opposite surface of said stick at spaced points lying between the stick portions engaged by the rod of the frame.

2. A stick holding device comprising a supporting frame including a pair of generally parallel longitudinally extending marginal rods having upwardly looped end portions defining handles, a pair of transversely extending marginal rods secured to said longitudinally extending marginal rods, additional transversely extending members secured to said longitudinally extending rods, and additional longitudinally extending rods secured below said additional transversely extending rods, a fixed upper tray including a pair of spaced parallel rods secured to said handles, a plurality of transversely extending rods secured to said last mentioned spaced parallel rods, and a plurality of additional longitudinal rods secured above the last mentioned transversely extending rods; said supporting frame and upper tray additional longitudinally extending rods extending in parallel vertically aligned, spaced relation to provide vertically spaced longitudinally extending stick-contacting surfaces; and a slide rack comprising a U-shaped outer marginal frame including a longitudinally extending base rod and parallel side rods, and a plurality of longitudinally extending clamping rods secured to said side rods, each clamping rod having a plurality of spaced, transversely offset, generally V-shaped bends; said clamping rods being transversely spaced a distance substantially equal to the distance between adjacent ones of said supporting frame additional longitudinally extending rods for cooperation with said supporting frame and upper tray stick-contacting surfaces to hold a plurality of sticks.

DANIEL GLAZER.

REFERENCES CITED

The following references are of record in the file of this patent:

UNITED STATES PATENTS

| Number | Name | Date |
|---|---|---|
| 2,044,354 | Isenberg | June 16, 1936 |
| 2,321,632 | Siemund | June 15, 1943 |
| 2,461,844 | Overland | Feb. 15, 1949 |